United States Patent

Blicha

[11] Patent Number: 5,564,220
[45] Date of Patent: Oct. 15, 1996

[54] FISHING LURE AND METHOD FOR MAKING THE SAME

[76] Inventor: Peter J. Blicha, 4061 Tucson St., Simi Valley, Calif. 93063

[21] Appl. No.: 220,112

[22] Filed: Mar. 30, 1994

[51] Int. Cl.⁶ .................................................. A01K 85/00
[52] U.S. Cl. ...................... 43/42.32; 43/42.33; 43/42.39; 43/42.53
[58] Field of Search ................... 43/42.39, 42.32, 43/42.53, 44.8, 42.33

[56] References Cited

U.S. PATENT DOCUMENTS

| | | | |
|---|---|---|---|
| 1,323,458 | 12/1919 | Dills | 43/42.33 |
| 1,385,627 | 7/1921 | Lane | 43/42.53 |
| 1,555,029 | 9/1925 | Russell | 43/42.32 |
| 1,639,863 | 8/1927 | Sinclair | 43/42.32 |
| 2,092,304 | 9/1937 | Eger | 43/42.32 |
| 3,528,189 | 9/1970 | Lilley, Jr. | 43/42.33 |
| 4,731,948 | 3/1988 | Helton | 43/42.53 |
| 5,077,930 | 1/1992 | Berry | 43/42.39 |
| 5,097,621 | 3/1992 | Hnizdor | 43/42.53 |

*Primary Examiner*—Kurt Rowan

[57] ABSTRACT

A fishing lure and method for making the same. The line is made by taking a conventional leadhead jig having a main body, an integral extension, and a hook placing prism tape on both sides of the jig body. The taped jig is then placed in a mold and clear fiberglass resin is cast about it sealing in the prism tape. This is now removed from the mold, painted to simulate a small bait fish and simulated eyes are taped on the jig body. The jig body is dipped into clear fiberglass resin which covers up any imperfections sealing in the simulated eyes. A conventional flexible soft plastic body and tail combination may now be inserted onto the jig extension portion and hook completing the lure.

12 Claims, 1 Drawing Sheet

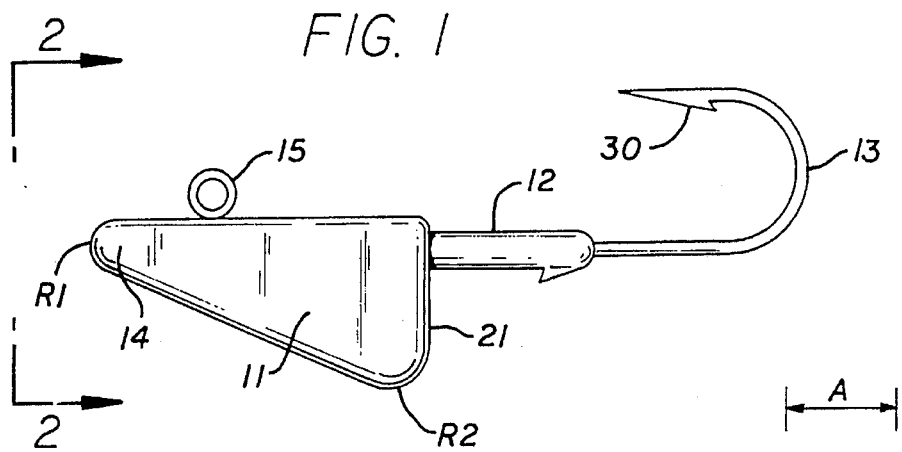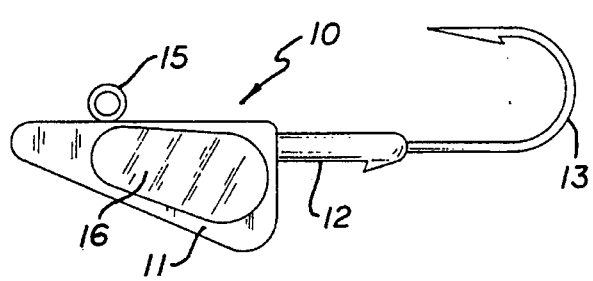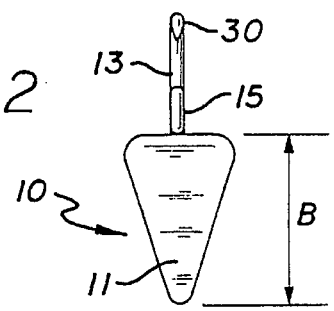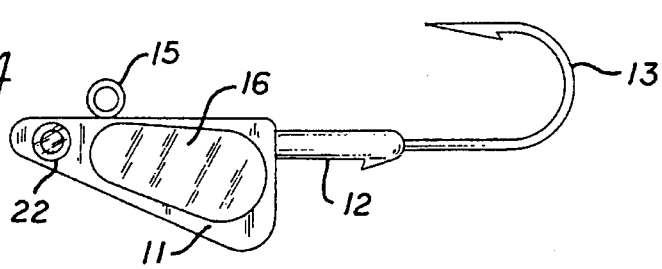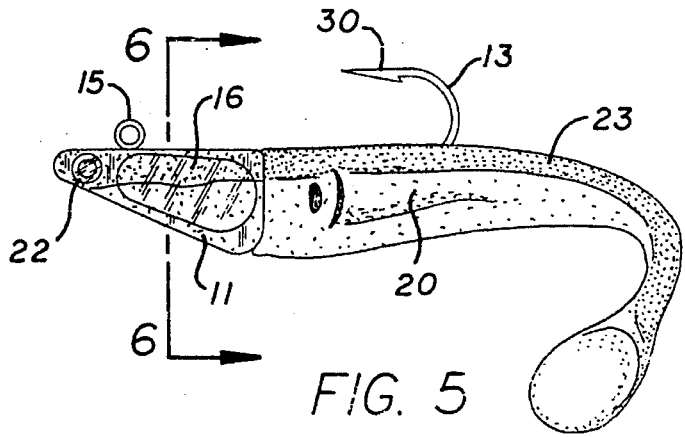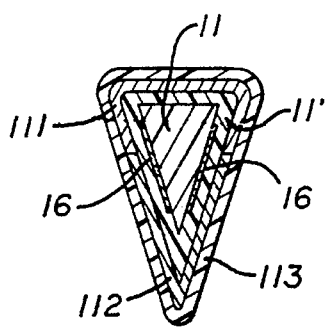

FISHING LURE AND METHOD FOR MAKING THE SAME

BACKGROUND OF THE INVENTION

1. FIELD OF THE INVENTION

The invention relates to fishing lures; and, particularly, to a fishing lure and a method of making the same.

2. DESCRIPTION OF THE PRIOR ART

Fishing lures are known which have a main body portion referred to as a leadhead jig with a hook integral therewith. A soft plastic body and tail combination is then inserted onto the hook and an extension leading from the main body portion to simulate a small bait fish. These lures are appropriately colored to match small bait fish in the area of use.

Changes have been made over the years in order to come up with fishing lures that closely simulate a naturally swimming small bait fish. Conventional leadhead jigs have a substantial amount of exposed lead (or lightly painted lead) which renders the same environmentally unsafe. Prior art lures of this type do not stand up after repeated usage, lose their sparkling or fish-like quality and thus no longer simulate fish scales.

There is thus a need for a lure wherein the conventional lead used in such lures is sealed off from the environment and the sealing resulting results in the lure lasting longer while better simulating a naturally swimming small bait fish having fish scales thereon.

SUMMARY OF THE INVENTION

It is an object of this invention to provide an improved fishing lure and method for making the same.

It is a further object of this invention to provide a method for making a fishing lure from a leadhead jig wherein the lead in the jig is sealed off from the environment.

It is still further an object of this invention to carry out the foregoing object wherein the sealing quality and fish scale simulation of the lure endures after repeated usage.

These and other objects are preferably accomplished by providing a fishing lure made by taking a conventional leadhead jig having a main body, an integral extension and a hook, and by placing prism tape on both sides of the jig body. The taped jig is then placed in a mold and clear fiberglass resin is cast about it, sealing in the prism tape. This is now removed from the mold, painted to simulate a small bait fish and simulated eyes are taped on the jig body. The jig body is dipped into clear fiberglass resin which covers up any imperfections and seals in the simulated eyes. A conventional flexible soft plastic body and tail combination may now be inserted onto the jig extension portion and hook completing the lure.

BRIEF DESCRIPTION OF THE DRAWING

FIG. 1 is an elevational view of a jig portion used in making the fishing lure and method of the invention;

FIG. 2 is a view taken along lines 2—2 of FIG. 1;

FIG. 3 is a view of the jig body of FIG. 1 showing placement of tape simulating fish scales on the main body portion thereof;

FIG. 4 is a view similar to FIG. 3 showing a simulated fish eye installed on the body of FIG. 3;

FIG. 5 is an elevational view of a completed lure in accordance with the teachings of the invention;

FIG. 6 is a view taken along lines 6—6 of FIG. 5.

DESCRIPTION OF THE PREFERRED EMBODIMENT

Referring now to FIG. 1 of the drawing, a conventional leadhead jig 10 is shown having a main body portion 11 of lead and an integral elongated barbed shaft portion 12, also of lead, extending rearwardly therefrom. A conventional hook 13 is fixedly secured to shaft portion 13 extending rearwardly therefrom terminating in a barbed hook portion 30 and a conventional eye loop 15 is integral with main body portion 11 to attach a fishing line thereto.

Although leadhead jig 10 is a conventional readily available jig, I prefer to use those leadhead jigs manufactured and sold by Leadmaster, Inc. of Hesperia, Calif. under Model No. WKH034. Such jigs are available as seen in FIG. 1. Preferably, the hook 13 is an Aberdeen-type hook of #5/0 size for the size I desire for use in the Southern California area. Obviously, other sizes and types of hooks may be used, selected for the type of fishing available.

Also, the overall length of leadhead jig 10 may be about 2½" and the width A, as seen in FIG. 2, may be about 7/16. The height B may be about 5/8". The overall length of main body portion 11 may be about 1¼". The radius of curvature $R_1$ (FIG. 1), at the tip or nose 14 of main body portion 11 may be about 30° degrees and the radius of curvature $R_2$ of main body portion 11 at the lower rear may be about 60° degrees.

The first step in making the final lure is to place strips 16 (see FIG. 3—only one side visible) of prism tape which is also readily available and pressure sensitive. I prefer to use the printed tape available by Phantom Tape Creations, Carol Stream, Ill. This tape is sold under Model No. 4-WO on #P1 (P1 referring to fish scale, silver prism). This tape may also be obtained with a name or trademark or the like imprinted thereon.

After pressing strips 16 in place on both sides of the main body portion, the jig 10 is placed into a mold and a clear fiberglass resin 11' (see FIG. 6) is cast about the body portion 11. It will harden in 2 to 3 hours. Although various types of resins may be used, I prefer to use the fiberglass resin with a hardening catalyst manufactured and sold by WASCO under the catalog #AW100-128.

This casting results in the resin sealing in the prism tape strips 16 so that they won't peel off in use. It also seals in the lead body portion making the finished lure environmentally safe.

After removing the cast 10 from the mold, and removing any flashing, the upper one-third or so portion of the main body portion 11 is painted, usually a dark color, such as dark green paint 111 (see FIG. 6), and a portion of the forward end 14 is also painted, as seen in FIG. 5, thus simulating the natural color of a bait fish (soft body and tail combination 20 is shown inserted onto extension portion 12 and hook 13 in FIG. 5, combination 20 abutting against rear end 21—FIG. 1—of main body portion 11). The lower end of main body portion 11 is also painted in a color simulating the lower part of a small bait fish, such as silver paint 112 (see FIG. 6). Although a number of suitable paints may be used, I prefer to use the lacquer paints, in forest green and silver, sold by Wasco under Model Nos. FR XX-4 and FR 19SS-4, respectively (the X's being used in place of numerals referring to various shades of green).

The eyes 22 (FIG. 4) are now pressed into position onto the painted main body portion 11. The eyes are preferably prism tape made by Phantom Tape Creations, about ¼ inch in diameter, with a black eyeball of about ⅛ inch in diameter, pressure sensitive, and sold by Phantom Tape under Model No. 4-EX.

The painted main body portion 11, eyes 27 in place, is now dipped in the same clear fiberglass resin as heretofore mentioned forming coating 113 (see FIG. 6). This seals in the eyes 22 and covers up any imperfections.

A conventional flexible soft plastic simulated fish body and tail combination 20 is now inserted over hook 13 and extension portion 12, up against end 21 of main body portion 11, as is shown in FIG. 5 and as is well known in the fishing art. As seen in FIG. 5, hook 13 extends out of the combination at point 23. The combination 20 is of any suitable type but preferably selected to blend in—due to its coloring—with painted main body portion 11. I prefer to use the soft body and tail combinations manufactured and sold by Worm King of Arleta, Calif. in a variety of colors and combinations.

Again, the colors are selected to correspond as much as possible to the bait fish in the area of fishing desired. For example, the closest shade of green or silver to such naturally appearing colors is selected.

Other combinations of paints and No. 5 hooks may be used. For example, the upper body portion WASCO colors, used with a No. 5 hook, may be as follows:

| Part Number | Description |
| --- | --- |
| PH-1-1 | Green 1 oz. |
| PH-1-2 | Blue 1 oz. |
| PH-1-3 | Black 1 oz. |
| PH-1-4 | Brown 1 oz. |
| PH-1-5 | Red 1 oz. |
| PH-1-6 | Copper 1 oz. |
| PH-1-7 | Blue/green 1 oz. |
| PH-1-8 | Blue/brown 1 oz. |
| PH-1-9 | Rainbow trout 1 oz. |

The lower body portion silver color would be the aforementioned WASCO silver paint.

My lures may be sold with or without the soft body and tail combination 20. It simulates the coloring and movement in the water of naturally occurring small bait fishes. Almost all of the main body portion 11 and extension portion 12 (both of lead) are sealed with resin, thus making my lures environmentally safe. A piece of live bait, such as squid, may be placed on hook 13, if desired, providing a scent. Body and tail combinations 20 may be replaced quickly and easily.

The completed lure possesses greater reflective qualities than known lures. The prism tapes used herein are shiny silver foils that are available in a variety of patterns and sizes, including one that resembles fish scales. Strips 16 are irregularly shaped ovals cut to fit the main body portion thus simulating fish scales. The resin seals in the eyes and the scale tapes 16. It lasts longer, maintains its sparkling qualities longer and better simulates fish scales. When the sun hits small live bait fish in the water, they flash in the water due to such reflection. If a fisherman retrieves my lure in the water and makes it dart, it also flashes due to its prism tape eyes and body portions, thus attracting fish.

There is thus described an improved lure and method for making the same. Although I have disclosed a particular lure and method for making the same, variations thereof may occur to an artisan and the scope of the invention should only be limited by the scope of the appended claims.

I claim:

1. A fishing lure adapted to simulate a small bait fish comprising:

a leadhead jig (10) having a main body portion (11) having an upper surface and an eyehook (10) integral with said upper surface, an integral extension portion (12) extending rearwardly from said main body portion (11) and a hook (13) integral with said extension portion (12) having a first hook portion extending rearwardly from said extension portion and coaxial therewith, then curving back over said first hook portion and generally parallel thereto terminating in a barbed portion;

a first coating (11) of a hardened clear plastic resin about said main body portion (11);

said main body portion (11) being painted with a dark color (111) approximately on one-third of the upper portion of the main body portion (11) and painted with a light color (112) approximately on two-thirds of the lower portion of the main body portion (11);

said main body portion having round circles of prism tape (22) simulating fish eyes and fish eyeballs mounted on each side of said painted main body portion (11); and a second coating (113) of a hardened clear plastic resin being disposed over said first coating (11') and said painted main body portion (110) with said prism tape (22) simulating eyes mounted thereon.

2. In the lure of claim 1 wherein said lure has a soft plastic fish body and fish tail combination mounted on said extension portion with the hook portion extending therethrough.

3. In the lure of claim 2 wherein said combination is painted along approximately one-third of the upper portion thereof in a color generally corresponding to the color of the approximately one-third of the upper portion of said main body portion and is painted along approximately two-thirds of the lower portion thereof in a color generally corresponding to the color of the approximately two-thirds of the lower portion of said main body portion.

4. In the lure of claim 3 wherein the upper approximate one-third portion of said combination is painted in a green color.

5. In the lure of claim 4 wherein the lower approximate two-thirds portion of said combination is painted silver.

6. In the lure of claim 1 wherein the upper approximate one-third portion of said main body portion is painted in a forest green color.

7. In the lure of claim 6 wherein the lower approximate two-thirds portion of said combination is painted silver.

8. In a method for forming a fishing lure adapted to simulate a small bait fish comprising:

placing elongated strips of pressure sensitive prism tape (16) on each side of the main body portion (11) of a leadhead jig (10) having said main body portion (11), an upper surface on said main body portion (12) with an integral eyehook (15) thereon, an integral extension portion (12) extending rearwardly from said main body portion (11) and a hook (13) integral with said extension portion (12) terminating in a barb having a first hook portion extending rearwardly from said extension portion and coaxial therewith, then curving back over said first hook portion and generally parallel thereto terminating in a barbed portion;

subsequently placing said jig (10) in a mold;

subsequently casting a first coat (11') of clear liquid fiberglass resin having a hardening catalyst therein about said jig (10);

subsequently allowing said first coat of resin to harden, then removing said jig (10) from said mold;

subsequently painting approximately one-third of the upper portion of said main body portion (10) with a dark colored lacquer paint (111) and approximately two-thirds of the lower portion of said main body portion with a light colored lacquer paint (112);

subsequently press fitting round circles of prism tape (22) simulating fish eyes and a fish eyeball on each side of said main body portion (11); and subsequently placing said main body portion (11) in a clear liquid fiberglass resin (113) having a hardening catalyst therein and maintaining said main body portion (11) in said last-mentioned resin (113) until it hardens and forms a second coat of hardened resin.

9. In the method of claim 8 including the step of inserting a soft plastic simulated fish body and tail combination having an upper and lower portion over said hook and said extension portion until said combination abuts against the junction of said main body portion and said extension portion and said barbed portion extends out of the upper portion of said combination.

10. In the method of claim 9 wherein the step of inserting said combination includes the step of inserting a combination painted along approximately one-third of the upper portion thereof in a color generally corresponding to the color of the approximately one-third of the upper portion of said main body portion and painted along approximately two-thirds of the lower portion thereof in a color generally corresponding to the color of the approximately two-thirds of the lower portion of said main body portion.

11. In the method of claim 8 wherein the step of painting said one-third of said main body portion includes the step of painting it forest green.

12. In the method of claim 11 wherein the step of painting said two-thirds of said main body portion includes the step of painting it silver.

\* \* \* \* \*